US008448218B2

(12) United States Patent
Bori

(10) Patent No.: US 8,448,218 B2
(45) Date of Patent: May 21, 2013

(54) METHOD AND APPARATUS FOR A CRYPTOGRAPHICALLY ASSISTED COMPUTER SYSTEM DESIGNED TO DETER VIRUSES AND MALWARE VIA ENFORCED ACCOUNTABILITY

(76) Inventor: Josep Bori, London (GB)

( * ) Notice: Subject to any disclaimer, the term of this patent is extended or adjusted under 35 U.S.C. 154(b) by 1201 days.

(21) Appl. No.: 12/016,007

(22) Filed: Jan. 17, 2008

(65) Prior Publication Data

US 2009/0187963 A1    Jul. 23, 2009

(51) Int. Cl.
*G06F 17/00* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| | | | |
|---|---|---|---|
| 4,405,829 A | 9/1983 | Rivest et al. | |
| 5,359,659 A | 10/1994 | Rosenthal | |
| 5,892,904 A | 4/1999 | Atkinson et al. | |
| 6,321,334 B1 | 11/2001 | Jerger et al. | |
| 6,567,917 B1 | 5/2003 | Ziese | |
| 6,604,198 B1 | 8/2003 | Beckman et al. | |
| 6,944,772 B2 | 9/2005 | Dozortsev | |
| 7,032,114 B1 | 4/2006 | Moran | |
| 7,055,175 B1 | 5/2006 | Le Pennec et al. | |
| 7,146,640 B2 | 12/2006 | Goodman et al. | |
| 7,236,610 B1 | 6/2007 | Luo et al. | |
| 7,281,268 B2 | 10/2007 | Hollander et al. | |
| 7,305,564 B2 | 12/2007 | Jin et al. | |
| 2002/0066022 A1* | 5/2002 | Calder et al. | 713/200 |
| 2003/0204742 A1* | 10/2003 | Gupta et al. | 713/200 |
| 2004/0019809 A1* | 1/2004 | Sheinis et al. | 713/202 |
| 2004/0153644 A1 | 8/2004 | McCorkendale et al. | |
| 2005/0177752 A1* | 8/2005 | Hollander et al. | 713/201 |
| 2006/0130144 A1 | 6/2006 | Wernicke | |
| 2006/0230452 A1* | 10/2006 | Field | 726/22 |
| 2007/0209076 A1* | 9/2007 | Porter et al. | 726/25 |
| 2008/0052762 A1* | 2/2008 | Hemsath et al. | 726/2 |

OTHER PUBLICATIONS

Paul F. Roberts, "As Threats Evolve, Defenses Must Adapt", eWeek magazine, Oct. 17, 2005, http://www.eweek.com/c/a/Security/As-Threats-Evolve-Defenses-Must-Adapt/.
Tony Bradley and Narasu Rebbapragada, "The New Virus Fighters", PC World magazine, Jan. 2008, http://pcworld.about.com/magazine/2403p082id124163.htm.
Microsoft Corporation, Authenticode technology, Microsoft Developers Network (MSDN) website (http://msdn2.microsoft.com/en-us/library/ms537359.aspx).
Microsoft's Next-Generation Secure Computing Base (NGSCB), http://www.microsoft.com/resources/ngscb/default.mspx.
Computer security forum at http://www.faqs.org/faqs/computer-virus.

* cited by examiner

*Primary Examiner* — Kambiz Zand
*Assistant Examiner* — Teshome Hailu

(57) ABSTRACT

The present invention provides a method and apparatus for a cryptographically assisted computer system designed to deter viruses and malware via enforced accountability and access policies. The Security Enforcement System (1000) comprises a security policies enforcement engine (400) configured to enforce security policies (200) to executable software files, based on their compliance with defined cryptographic policies (100). In a preferred embodiment, cryptographic policies (100) include the unequivocal identification of the software author or authors, and the security policies (200) are defined such that properly encrypted software files are given full access rights to the computer system resources (600, 700, 800, 900), whereas non-compliant files are given limited access rights to neuter potential malicious behavior goals. The security enforcement system engine (400) applies the security policies (200) to a software file and all its dependants, including spawn processes and threads as well as dynamic link libraries and other independent executable file objects.

20 Claims, 4 Drawing Sheets

Sample security policy

1. Save executable and related files
2. Access boot sector of a drive
3. Modify specific file types (e.g. EXE, DLL, COM, VBX, etc)
4. Access open Internet (only access to secure sites allowed)

Fig. 3

METHOD AND APPARATUS FOR A CRYPTOGRAPHICALLY ASSISTED COMPUTER SYSTEM DESIGNED TO DETER VIRUSES AND MALWARE VIA ENFORCED ACCOUNTABILITY

BACKGROUND OF THE INVENTION

1. Field of the Invention

The present invention relates to computer/network security systems, and more particularly, to detecting/preventing unwanted processes.

2. Background

A software or computer "virus" is a special piece of program code, usually created by a malicious programmer, that exists within ("infects") an otherwise normal computer program. A worm or a trojan runs independently and somehow manages to surreptitiously get installed and run malicious functionality without the user consent. When an infected program is run, the malicious code seeks out other programs within the computer and replicates itself. Infected programs can be anywhere in the system or even the operating system itself, and if undetected can have devastating effects, such as interfering with system operations or destruction/misappropriation of data. Malware is a more generic term used to refer to all the varieties of malicious code.

Traditionally, this threat has been approached by a "blacklist approach", that is, allowing all software to run in a system until it is determined by some technical means that it is indeed a piece of malware or, at least, its behavior makes it suspicious, at which point it is blocked or "quarantined" pending of human assessment. The obvious and theoretical alternative is to use a "whitelist approach" such that no piece of software can run in a system unless it has been specifically authorized. However, although very efficient in preventing malware infections, in reality, the later approach is not used because it puts an extreme administrative burden onto the system or security administrator in the best case (i.e. a relatively large business where such role exists) or a completely unmanageable burden in most cases (i.e. consumers or small/medium businesses, who have no way of determining what software is benign or not). This approach is particularly inappropriate for consumers, as an excessive amount of input required from them to determine authorizations eventually lead most users not to bother and just give access to everything to be able to do some work. And, still, the approach has a "single point of failure" in the sense that it all depends on the system/security administrator properly authorizing or denying access to all the pieces of software. Thus, if a system is compromised, a "virus" could actually "infect" an already authorized piece of software and then widely spread. In fact, the "whitelist approach" is not typically used and the market leading security solutions vendors at the time of this application (e.g. Symantec, McAfee, Trend Micro, Computer Associates, etc) all use the "blacklist approach" based on a variety of technologies. Multiple patents have been issued under this generic approach, such as U.S. Pat. No. 7,032,114 to Moran (2006) and assigned to Symantec Corporation, which is based on virus signatures.

The "blacklist approach" suffers from a slow resolution of attacks by design: when a new piece of malware requires the creation of a new signature or an intrusion detection algorithm, it all depends on the rapid distribution of the new signature to the millions of antivirus software instances, and the reality is that many computers are running with obsolete virus signatures and therefore are defenceless. This problem makes the effort of creating a new piece of malware worth the efforts to hackers, as by spreading it to large numbers of computers they will still manage to infect a large enough number of systems and therefore achieve their malicious goals.

Another issue the current solutions face is the "false positives", that is, flagging and quarantining an application/file as infected or suspicious when it is not, sometimes even crippling a system if that file is critical to the operating system. In fact, this is an unsurprising outcome given the growing numbers of malware that is currently created. The trade-off is an expensive one: if the signature is generic enough to catch many similar viruses, false positives arise, but if the signatures are narrow enough to only catch the specific virus, then hackers just need to continuously modify their creations slightly to avoid detection. And in fact, they are even using cryptographic techniques to make almost impossible their detection (e.g. polymorphic viruses), which highlights even more the long term scalability issue of this solution.

In reality, with the open Internet which allows the real-time download of new applications to computer users, the problem of determining whether an application should be allowed to run in a system is actually dual; (1) is the application a legitimate one upfront (e.g. at download/installation time)?, and (2) if it was, has it been infected now and should not be allowed to run again?

Although attempts at resolving the first problem have been made using cryptographic technologies (for instance, see U.S. Pat. No. 5,359,659 to Rosenthal (1994) using embedded security routines, U.S. Pat. No. 7,236,610 to Luo, et al. (2007) using watermarks, or Microsoft's Authenticode technology using cryptographic techniques), ensuring that the downloaded application has not been infected during the transmission and that it really comes from who we think it comes from (authentication), the second problem has not been successfully addressed. In reality the approach in Rosenthal requiring the embedding of security routines in the software which are able to detect tampering and eventually disable the software itself, or the approach in Luo et al. using watermarks in the file, have been largely improved by other approaches based on the use of cryptography technologies. Note that the theoretical basis of these diverse cryptographic approaches to securing code authoring and transfer is the famous RSA algorithm described in U.S. Pat. No. 4,405,829 to MIT academics Rivest, Shamir and Adleman (1983), which has enabled the growth of e-commerce and created the certificate authority industry. A certificate authority is an organization that issues the public and private keys used by the RSA algorithm and plays a trustable independent third party role in e-commerce transactions. Examples of certificate authorities include Thawtc (www.thawte.com), VeriSign (www.verisign.com). Canada Post (www.canadapost.ca) and the United States Post. Office (www.usps.com).

With regards of the second problem, that is, determining whether the applications about to be launched in a computer system have actually been infected (or are malicious) and should not be allowed to run, the current solutions are somewhat unsatisfactory.

(a) Dictionary of signatures: the engine will compare each file with the entries in a database or dictionary of known virus signatures. This is intrinsically a reactive approach, as any new virus will not initially be detected and each anti-virus vendor will have to identify and create a virus signature and potentially a cleanup procedure, and thus will have a delayed solution. Additionally, a more sophisticated virus (e.g. polymorphic virus) is unlikely to be detected.

(b) Suspicious behavior/Heuristics based: the engine will actually monitor the behavior of all running programs for what is considered a suspicious behavior (e.g. write data to an executable file, changing the registry, modify itself, etc), and request a user decision on whether to allow it or not. Various patents have been issued based on this approach, such as U.S. Pat. No. 7,281,268 to Hollander at al. (2007). While the clear advantage is that brand new viruses will be detected under this approach, a lot of false positives (i.e. completely licit programs being flagged as suspicious) will typically be generated and an overload of access authorization requests from the anti-virus software will eventually make the user insensitive (e.g. in the worst case scenario the user will give access to everything).

(c) Code emulation: the engine will emulate the initial code of the executable to detect suspicious behavior, and if so, flag it as a potential virus. However, this method can yield a lot of false positives.

(d) Sandbox: the engine will actually pro-run the executable in a sandbox, that is, an emulated operating system, and analyze the changes after it has completed. Various patents have been issued bawd on this approach, such as U.S. Pat. No. 7,146,640 to Goodman, et. al. (2006). The performance limitations of this method are obvious as well as the fact that it would not help detect non-deterministic malware or malware that depends on external input.

Finally, it is also worth noting that most current solutions do not aim at deterring or even catching the malware authors or hackers, who are content to keep trying until they fund another security hole, which will have to be closed later on by the security vendors. Ultimately, the computer security issue has become a battle of wits between the hacker and the anti-virus communities. And, in fact, it is just a game of numbers for hackers, as even low rates of infection success on a percentage basis make the criminal enterprise economically worthwhile when spread to large numbers of computers, which explains why the overwhelming majority of malware is produced for the most popular commercial operating systems, such as Microsoft Windows or Apple Macintosh, at the time of this application. Attempts have been to address this issue, most noteworthy U.S. patent application 20040153644 by McCorkendale, Bruce et al. (2004), which aims at preventing execution of potentially malicious software by using execution authorities which sign and certify software and maintain a database of software status information indicating whether the software is potentially malicious. This is an unsatisfactory approach because (1) maintaining a "whitelist" of software instead of developers is unmanageable for both trust authorities and developers, especially if all dynamic link libraries and other executable objects that can be loaded at run time are included, (2) absolutely all software needs to be registered in order to be able to run, with no concept of exempt software or limited access rights & zones for less demanding software, and (3) it does not contemplate the need to encrypt or sign the entire chain of executable objects, such as dynamic link libraries, so by infecting one of these shared objects a virus would still gain control of a computer system when it would be called by a fully authorised piece of software.

Summarizing, the prior art is unsatisfactory due to the following reasons: (1) the "whitelist approach" poses an unmanageable administrative burden on the computer system's user or administrator, (2) the "whitelist approach" has a single point of failure in the list itself, so once a system is infected there are no more safety stops, (3) the "blacklist approach" is a reactive approach in nature, which requires continuous analysis of new malware and the creation of new "signatures" and/or intrusion detection algorithms, (4) the "blacklist approach" requires the distribution of said black lists (in the form of updated signatures and/or parameters), and therefore non fully updated systems will remain unprotected, (5) the "signature based" approach suffers from the "false positives" problem, which poses limits to the scalability of the solution, and (6) no current system aim at helping stop the hackers but just that particular piece of malware.

Unlike the present invention, the prior art has never been able to ensure hacker liability for any malicious code running in a system nor managed to transfer the authorization management burden to the software developers, with no need for malware signatures.

SUMMARY OF THE INVENTION

The present invention provides a method and apparatus for a cryptographically assisted computer system designed to deter viruses and malware via enforced accountability and access policies. The Security Enforcement System (1000) comprises a security policies enforcement engine (400) configured to enforce security policies (200) to executable software files, based on their compliance with defined cryptographic policies (100). In a preferred embodiment, cryptographic policies (100) include the unequivocal identification of the software author or authors, and the security policies (200) are defined such that properly encrypted software files are given full access rights to the computer system resources (600, 700, 800, 900), whereas non-compliant files are given limited access rights to neuter potential malicious behaviour goals. The security enforcement system engine (400) applies the security policies (200) to a software file and all its dependants, including spawn processes and threads as well as dynamic link libraries and other independent executable file objects.

BRIEF DESCRIPTION OF THE DRAWINGS

FIG. 3 is a sample list showing one embodiment of the security policies 200.

DETAILED DESCRIPTION OF THE INVENTION

The method and apparatus of the present invention will now be discussed with reference to FIGS. 1, 2, 3, and 4.

Figure 1:
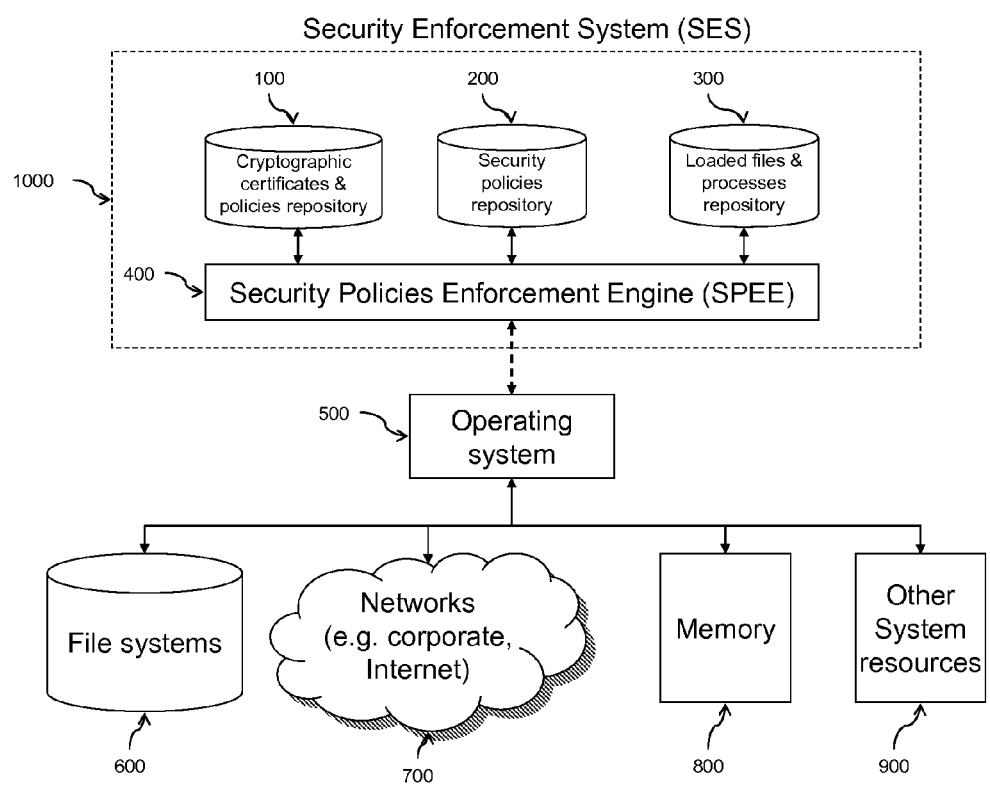
FIG. 1 is a block diagram illustrating the main components of a first embodiment of the present invention.

FIG. 1 is a block diagram illustrating the main components of the systems architecture of a first embodiment of the present invention. Such figure illustrates a possible systems architecture configuration of a computer system in accordance with one embodiment having an operating system 500 managing all system resources, such as file systems 600, networks 700, memory 800 and others 900. The computer system shown in FIG. 1 also includes a security enforcement system 1000, which comprises a cryptographic certificates and policies repository 100, a security policies repository 200, a repository tracking all loaded files and processes 300, and a security policies enforcement engine 400 to coordinate all the elements within the security enforcement system 1000.

The computer system may have resident thereon any desired operating system. It will be appreciated that an embodiment may also be implemented on platforms and operating systems other than the widely used Microsoft Corporation family of operating systems. One embodiment may be written using JAVA, C, and/or C++ language, or other programming languages, along with an object oriented programming methodology. Object oriented programming (OOP) has become increasingly used to develop complex applications. The security enforcement system 1000 may also be a part of the operating system, in an alternative embodiment. Also, the cryptographic certificates and policies repository 100 and the security policies repository 200 could be located in a different computer system and maintained by trusted third parties, in an alternative embodiment.

Of course, the various embodiments set forth herein may be implemented utilizing hardware, software, or any desired combination thereof. For that matter, any type of logic may be utilized which is capable of implementing the various functionality set forth herein.

Figure 2:
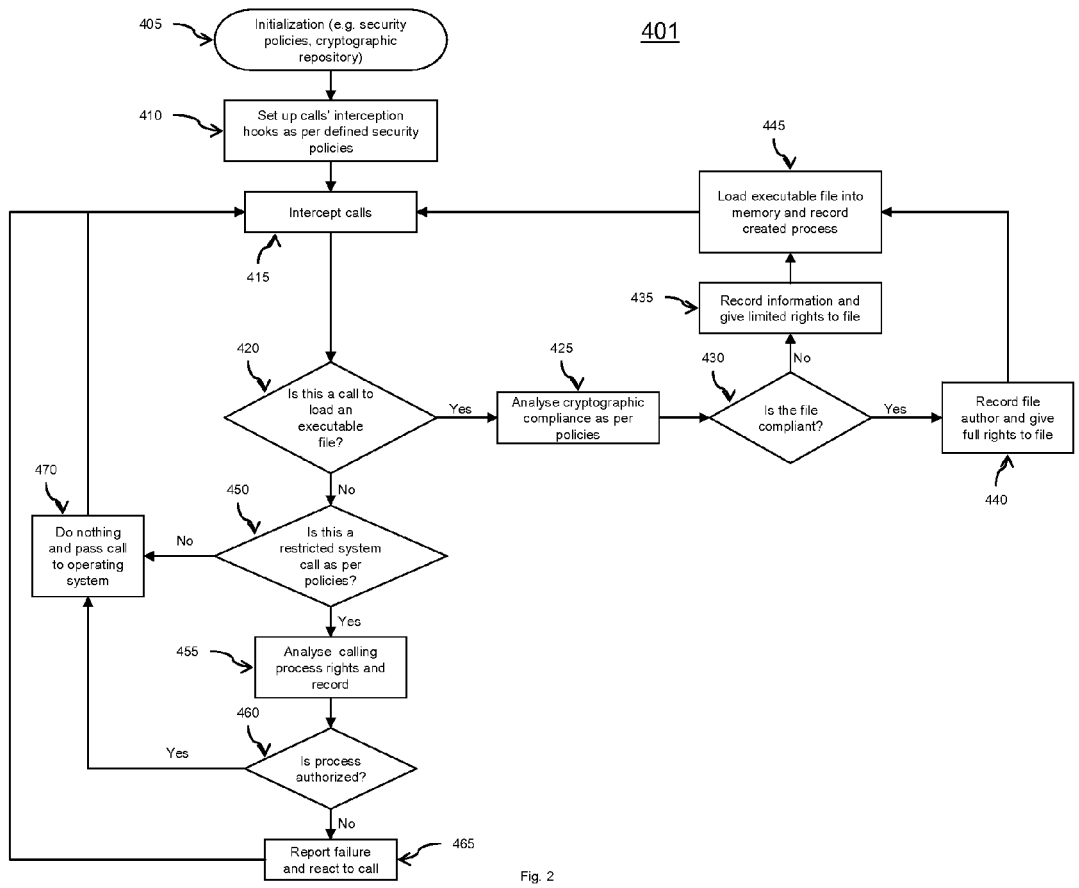
FIG. 2 is a flowchart of the security policy enforcement method 401 implemented by a security policies enforcement engine (400) in accordance with one embodiment.

FIG. 2 is a flowchart of the security policy enforcement method 401 implemented by a security policies enforcement engine 400 in accordance with one embodiment. As an option, the security policy enforcement method 401 may be implemented in the context of the architecture and environment of FIG. 1. Of course, however, the security method 401 may be carried out in any desired environment.

The security policy enforcement method 401 may begin with operation 405 by initializing all the data structures and modules comprising the security enforcement system 1000, including the cryptographic certificates and policies repository 100 and the security policies repository 200, which are applicable to resources including executable files, and as is described further below when describing operation 425, may be loaded with information provided by independent and trusted third parties. Next, operation 410 makes the arrangements necessary to enable the interception of calls in operation 415 by setting up call interception hooks or any alternative means and following the configuration contained in the security policies repository 200. Such policies may vary in different embodiments of the invention, with FIG. 3 describing a sample embodiment of the security policies repository 200, but effectively aiming to control functionality that is necessary to perform malware's activities. The technical means by which calls can be intercepted will vary depending on the specific embodiment and in particular on the operating system, but these techniques are widely known in the industry and would be obvious to a person skilled in the art.

Next the security policies enforcement agent 400 may continue by intercepting a call, in operation 415. In the context of the present description, the call may include a system call, a user mode call, a kernel mode call, an application program interface (API) call, a function call, a network message call, a remote procedure call, a queued message call, a calling routine, and/or any other code and/or function that is capable of invoking and/or executing another code and/or function. Still, the act of intercepting may refer to any technique of capturing, monitoring, interrupting, and/or any other act capable of allowing a user to associate the call with a file from which the process including the call was loaded into the computer system memory 800, and/or gather state information associated with the call, in the manner that will soon be set forth in greater detail. As an option, the call may include detailed information, such as a call name, optional parameters, and/or an outcome of the call (i.e. return code); although any information associated with the call may or may not be included.

It is next determined, in operation 420, whether the call is a request to load an executable file, which will depend on the actual operating system of the embodiment of the invention. By executable file we refer in the present description to any file that contains code that may eventually be loaded into the system memory 800 and executed by the operating system 500 either directly of by being called by other processes. For instance, in the Microsoft Windows operating systems family, the current definition of executable file would include, but not be limited to, .EXE files, .COM files, .CMD files, .DLL files, ActiveX fiefs and any others that the operating system may be capable of loading into the computer memory 800 as executable code.

If operation 420 determines that the call is indeed a request to load an executable file into memory 800 according to the above definition, operation 425 will verify such file compliance with the cryptographic certificates and policies repository 100, which will ensure at least unequivocal identification (authentication) of the authors of said file. The specific cryptographic certificates and policies will vary depending on the system architecture, one embodiment of the possibilities being described in FIG. 1, and the specific embodiment of the security enforcement system 1000. As noted in the above description of FIG. 1, alternative embodiments of the security enforcement system 1000 may involve the cryptographic certificates and policies repository 100 being externally provided by an independent and trusted third party. Nowadays several organizations known as Certificate Authorities, such as Thawte (www.thawte.com), VeriSign (www.verisign.com). Canada Post (www.canadapost.ca) and the United States Post Office (www.usps.com), already provide cryptographic certificate services to facilitate e-commerce transactions and, thus, may be used to perform this role in a particular embodiment. In any case, a key requirement of any embodiment of the cryptographic certificates and policies repository 100 is that it must enable unequivocal identification (or authentication) of the author of the file being presented for loading into memory 800 in the intercepted call in operation 415. As mentioned in the background of the invention section, there currently exist many ways to authenticate a file, various of them described in patents such as U.S. Pat. No. 4,405,829 to Rivest, Shamir and Adleman (1983), U.S. Pat. No. 5,359,659 to Rosenthal (1994), or U.S. Pat. No. 6,567,917 to Ziese; Kevin J. (2003), as well as commercial technologies such as Microsoft Corporation's technology called Authenticode, which detailed description can be found in the Microsoft Developers Network (MSDN) website at http://msdn2.microsoft.com/en-us/library/ms537359.aspx, are publicly available. However, it is worth noting that these techniques ensure the transferred or downloaded file comes from who the buyer thinks, that is, it has been authenticated, but the file can actually be infected by malware afterwards and, in fact, nothing forces hackers to use these technique to distribute their malware.

The security enforcement system 1000 aims to deter virus and other malware attacks on the computer systems implementing such system by forcing the malware's authors to identify themselves if the executable file is to be able to behave maliciously within it, that is, by enforcing accountability. Malware and viruses can be defined in many ways, and that will determine the embodiment of the security policies repository 200. As an example, the definition attributed to security expert Fridrik Skulason in the security forum at http://www.faqs.org/faqs/computer-virus/alt-faq/part1/ may be used: "#1 A virus is a Program that is able to replicate—that is, create (possibly modified) copies of itself, #2 The replication is intentional, not just a side-effect, #3 At least some of the replicants are also viruses, by this definition, #4 A virus has to attach itself to a host, in the sense that execution of the host implies execution of the virus". Based on this definition, an embodiment is proposed in FIG. 3, which will be further discussed below.

Next, operation 430 will determine with the output from the analysis in operation 425 and the current information in the loaded files and processes repository 300 if the said file is compliant with the policies contained in the cryptographic certificates and policies repository 100. If it is, next operation 440 will record the file author and other file and process related information into the loaded files and processes repository 300 assigning it full rights, else operation 435 will record other file and process related information into the loaded files and processes repository 300 but assigning it limited rights. After either operation 435 or operation 440 is completed, operation 445 will effectively load the code contained in the file into memory 800 for execution by the operating system 500, record additional process related information into the loaded files and processes repository 300 so that the security policies contained in the security policies repository 200 applicable to the file can be associated to the created process, and finally return control to the operating system 500 for completion of the previously intercepted call in operation 415 and then loop back to intercept the next call in operation 415.

If operation 420 determined that the call is not a request to load an executable file into memory, operation 450 will determine if the intercepted call is a restricted call as per the security policies repository 200. If it is not, operation 470 just returns control to the operating system 500 for completion of the previously intercepted call in operation 415 and loops back to intercept the next call in operation 415. If it is, operation 455 then analyses the calling process rights as stated in the loaded files and policies repository 300, including not only the immediate calling process by also all the precedent calling or parent processes.

Next operation 460 determines with the input from operation 455 if the calling process identified is authorised to execute the call intercepted in operation 415, and records file and process related information into the loaded files and process repository 300. There are several embodiments of the operation 460, and we will provide a couple herein for illustration but not limiting purposes. On one embodiment, operation 460 ensures that the entire chain of calling processes has full rights according to the loaded files and processes repository 300. On a second embodiment of operation 460, only the calling process is required to have full rights. If the process is determined to be authorised, then operation 470 returns control to the operating system 500 for completion of the previously intercepted call in operation 415 and loops back to intercept the next call in operation 415. Alternatively, if the process is determined not to be authorised, then operation 465 reports failure to execute the call and then loops back to intercept the next call in operation 415.

FIG. 3 is a sample list showing one embodiment of the security policies 200. As said in the description of FIG. 2 the embodiment presented in FIG. 3 is based on the definition attributed to security expert Fridrik Skulason in the security forum at http://www.faqs.org/faqs/computer-virus/alt-faq/part1/, that includes 4 characteristic behaviours: "#1 A virus is a program that is able to replicate—that is, create (possibly modified) copies of itself, #2 The replication is intentional, not just a side-effect, #3 At least some office replicants are also viruses, by this definition, #4 A virus has to attach itself to a host, in the sense that execution of the host implies execution of the virus". Policy 1 and 3 in FIG. 3 seek to make behaviour #1 and #3 impossible unless the file author has unequivocally identified himself or herself by encrypting the file. Policy 2 sucks to avoid behaviour #4, and Policy 4 seeks to limit the reach of behaviour #1.

Figure 4:
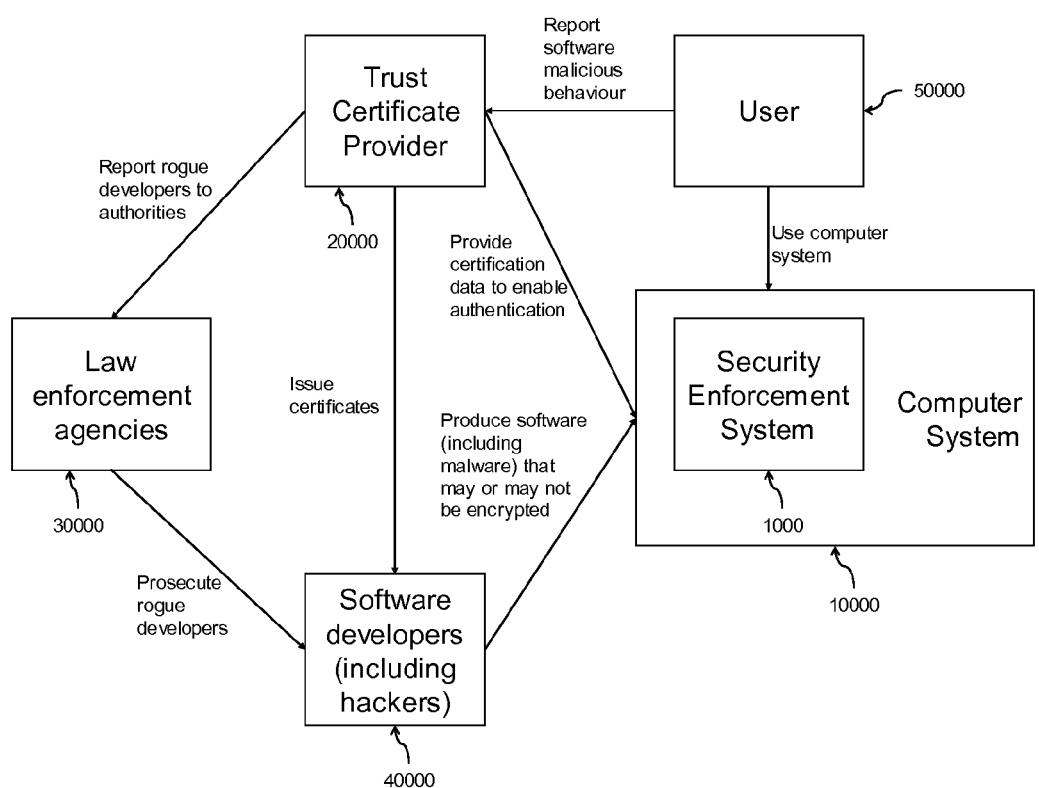
FIG. 4 illustrates the main players in the security ecosystem supported by a first embodiment of the present invention

FIG. 4 illustrates the main players in the security ecosystem supported by a first embodiment of the present invention. Such figure shows a computer system 10000, protected by a security enforcement system 1000 implementing one embodiment of the present invention, a trust certificate provider 20000, a software developer 40000 which may or may not be a rogue developer or hacker, the law enforcement agencies 30000 and the computer system user 50000. Trust certificate provider 20000 issues cryptographic certificates to software developers which may use them to encrypt the software they produce according to the security policies enforced by the security enforcement system 1000. The security enforcement system 1000 will control the access to the resources of computer system 10000. The user 50000 of the computer system 10000 can report the developer 40000 who created any malicious software or malware that damages computer system 10000 to the trust certificate provider 20000, as the security enforcement system 1000 is able to identify the creator developer 40000 of any software that was given full access to the resources in computer system 10000 and was therefore capable of showing effective malicious behaviour. The trust certificate provider 20000 can then report the rogue developer 40000 to the appropriate law enforcement agencies 30000, who can prosecute the said rogue developer 40000. Alternatively, the user 50000 of the computer system 10000 can report the developer 40000 who created any malicious software or malware that damages computer system 10000 to the appropriate law enforcement agencies 30000.

This invention is perceived to be deterrent to hackers because any successful malware would require the author or authors to unequivocally identify in a cryptographic certificates and policies repository 100, which in a particular embodiment could be done via a certificate authority, and therefore the law would easily be enforceable. However, software developers whose applications do not require the functionality deemed necessary by hackers (e.g. access to system registry, ability to create executable files or modify them, etc) and stored in the security policies repository 200 would not carry this extra burden. Additionally, certificates can be easily revoked if a developer is determined to be a hacker, and therefore the spread of malware infections can be contained in real-time, without the need for distributing security system update as it is the case in current anti-virus systems.

The novelty of this approach is that (1) it does not attempt to identify behaviour that is "sufficient" to flag a piece of software as malicious, but to enforce authentication for software with functionality that is "necessary" for malware to be effective, which is a much easier requirement, and (2) shifts the burden of getting non malicious software cleared by the security system to the software developers instead of the user and/or the security companies.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

The invention claimed is:

1. A security method, comprising:
(a) providing a repository which is able to store initial cryptographic certificates and policies for resources including, but not limited to, executable files, whereby the resource's author can be authenticated, and system calls that are necessary for malicious behaviour are identified, (b) providing a repository which is able to store initial security policies, (c) providing a repository which is able to store loaded files and processes state information, (d) providing a memory which is able to store executable code, (e) intercepting a call, (f) determining whether the call is a request to load an executable file into said memory, (g) when it is determined that the call is a request to load an executable file into said memory, analysing the cryptographic compliance as per initially determined policies and determining whether it is compliant, (h) when it is determined that the file is compliant with said cryptographic policies, loading said file into said memory, assigning it full rights, updating state information related to the call, the associated file including, but not limited to, the unequivocal identification of the resource's author, and the newly loaded process into said memory, (i) when it is determined that the file is not compliant with cryptographic policies, loading said file into memory, assigning it limited rights, updating state information related to the call, the associated file, and the newly loaded process into said memory, (j) when it is determined that the call is not a request to load an executable file into memory, determining whether the call is a restricted call as per the initially determined security policies, (k) when it is determined that the call is restricted, determining the calling process rights based on the state machine information of the calling process hierarchy, (l) when it is determined that the process is not authorised, updating the state machine information, reacting to the unauthorised call, (m) when it is determined that the process is authorised, updating the state machine information, returning control to the operating system, repeating (c)-(m);

wherein an interceptor intercepts the call and forwards the call to a detector, wherein the detector includes an infrastructure for providing a state machine;

whereby executable files requiring full rights will need to comply with said initial cryptographic certificates and policies, including but not limited to unequivocal identification of the resource's author, whereby executable files with limited rights will not be able to perform activities, including, but not limited to, system calls, necessary for malware's malicious behaviour as defined in the initial policies;

whereby the revocation of the cryptographic certificates of the resources, including, but not limited to, executable files, will prevent the propagation of malware without the need for distribution of updates for the security method here described;

whereby the post-mortem analysis of the cryptographic certificates of malware allows for the legal prosecution and accountability of the malware's authors.

2. The method as recited in claim 1, wherein initial cryptographic certificates and policies include the unequivocal identification of the author of the file to be determined compliant.

3. The method as recited in claim 1, wherein initial security policies include the restriction of behaviour, including, but not limited to, system calls, deemed necessary for malware to achieve its malicious goals, but not sufficient to classify a piece of software as malware, including, but not limited to, saving executable and related files, accessing boot sector of a drive, modifying executable and related file types, and accessing the open Internet.

4. The method as recited in claim 1, wherein the call is selected from the group consisting of a system call, a user mode call, a kernel mode call, a function call, a network message call, a remote procedure call, a queued message call, an application program interface (API) call, and a calling routine.

5. The method as recited in claim 1, wherein the state information is selected from the group consisting of a name of the call, optional parameters, the name of the file from where the calling process was loaded into memory, the author of the file from where the calling process was loaded into memory, and an outcome of the call.

6. The method as recited in claim 1, wherein the state information includes a name of the call, optional parameters, and an outcome of the call.

7. The method as recited in claim 1, wherein process refers to not only processes, but also dynamic link libraries and any other independent object which can be treated as executable code by the operating system.

8. The method as recited in claim 1, wherein the reacting includes not returning control of the intercepted call to the operating system.

9. The method as recited in claim 1, wherein the reacting includes terminating the unwanted process.

10. The method as recited in claim 1, wherein the state machine is provided utilizing a plug-in interface.

11. A machine for enforcing security policies within a computer system, comprising:

(a) a cryptographic certificates and policies repository for resources including, but not limited to, executable files, whereby the resource's author can be authenticated, and system calls that are necessary for malicious behaviour are identified, (b) a security policies repository, (c) a loaded files and processes repository able to hold state machine information, (d) a memory which is able to store executable code, (e) a security policies enforcement agent which will:

(f) intercept a call, (g) determine whether the call is a request to load an executable file into said memory, (h) when it is determined that the call is a request to load an executable file into said memory, analyse the cryptographic compliance as per the said cryptographic certificates and policies repository and determine whether it is compliant, (i) when it is determined that the file is compliant with said cryptographic policies, load said file into said memory, assign it full rights, update state information related to the call, the associated file including, but not limited to, the unequivocal identification of the resource's author, and the newly loaded process into said memory, (j) when it is determined that the file is not compliant with cryptographic policies, load said file into said memory, assign it limited rights, update state information related to the call, the associated file, and the newly loaded process into said memory, (k) when it is determined that the call is not a request to load an executable file into memory, determine whether the call is a restricted call as per the security policies repository, (l) when it is determined that the call is restricted, determine the calling process rights based on the state machine information of the calling process hierarchy, (m) when it is determined that the process is not authorised, update the state machine information, and react to the unauthorised call, (n) when it is determined that the process is authorised, update the state machine information, and return control to the operating system, repeating (f)-(n);

whereby executable files requiring full rights will need to comply with said cryptographic certificates and policies repository, including but not limited to unequivocal identification of the resource's author, whereby executable files with limited rights will not be able to perform activities, including, but not limited to, system calls, necessary for malware's malicious behaviour as defined in the initial policies;

whereby the revocation of the cryptographic certificates of the resources, including, but not limited to, executable files, will prevent the propagation of malware without the need for distribution of updates for the security method here described;

whereby the post-mortem analysis of the cryptographic certificates of malware allows for the legal prosecution and accountability of the malware's authors.

12. The method as recited in claim 11, wherein the cryptographic certificates and policies repository includes policies requiring the unequivocal identification of the author of the file to be determined compliant.

13. The method as recited in claim 11, wherein security policies repository includes policies related to the restriction of behaviourdeemed necessary for malware to achieve its malicious goals, but not sufficient to classify a piece of software as malware, including, but not limited to, saving executable and related files, accessing boot sector of a drive, modifying executable and related file types, and accessing the open Interact.

14. The method as recited in claim 11, wherein the call is selected from the group consisting of a system call, a user mode call, a kernel mode call, a function call, a network message call, a remote procedure call, a queued message call, an application program interface (API) call, and a calling routine.

15. The method as recited in claim 11, wherein the state information is selected from the group consisting of a name of the call, optional parameters, the name of the file from where the calling process was loaded into memory, the author of the file from where the calling process was loaded into memory, and an outcome of the call.

16. The method as recited in claim 11, wherein the state information includes a name of the call, optional parameters, and an outcome of the call.

17. The method as recited in claim 11, wherein process refers to not only processes, but also dynamic link libraries and any other independent object which can be treated as executable code by the operating system.

18. The method as recited in claim 11, wherein the reaction includes not returning control of the intercepted call to the operating system.

19. The method as recited in claim 11, wherein the reaction includes terminating the unwanted process.

20. The method as recited in claim 11, wherein the state machine is provided utilizing a plug-in interface.

* * * * *